(12) United States Patent
Elkady

(10) Patent No.: US 7,747,938 B2
(45) Date of Patent: Jun. 29, 2010

(54) DATA INSERTION FROM A DATABASE INTO A FIXED ELECTRONIC TEMPLATE FORM

(75) Inventor: Osama Elkady, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 726 days.

(21) Appl. No.: 10/839,435

(22) Filed: May 4, 2004

(65) Prior Publication Data

US 2005/0251733 A1    Nov. 10, 2005

(51) Int. Cl.
G06F 17/00 (2006.01)
G06F 15/16 (2006.01)

(52) U.S. Cl. ............... 715/209; 715/222; 715/234; 715/243; 715/255; 709/203; 709/217

(58) Field of Classification Search .......... 715/503, 715/500.1, 501, 530, 743, 521, 522, 524–526, 715/234, 239, 249, 255, 200, 204, 209, 212–227, 715/229, 243, 256, 273; 707/100, 201; 709/201, 709/203, 217
See application file for complete search history.

(56) References Cited

U.S. PATENT DOCUMENTS

| | | | | |
|---|---|---|---|---|
| 5,978,787 | A * | 11/1999 | Wong et al. | 707/2 |
| 6,167,517 | A * | 12/2000 | Gilchrist et al. | 713/186 |
| 6,199,058 | B1 * | 3/2001 | Wong et al. | 707/2 |
| 6,233,684 | B1 * | 5/2001 | Stefik et al. | 713/176 |
| 6,272,506 | B1 * | 8/2001 | Bell | 715/255 |
| 6,490,601 | B1 * | 12/2002 | Markus et al. | 715/507 |
| 6,529,904 | B1 * | 3/2003 | Elsbernd et al. | 707/201 |
| 6,532,479 | B2 * | 3/2003 | Souder et al. | 707/201 |
| 6,697,804 | B1 * | 2/2004 | Elsbernd et al. | 707/6 |
| 6,708,186 | B1 * | 3/2004 | Claborn et al. | 707/6 |
| 7,203,699 | B2 * | 4/2007 | Bellamy | 707/102 |
| 2002/0059265 | A1 * | 5/2002 | Valorose, III | 707/100 |
| 2002/0083092 | A1 * | 6/2002 | Simpson | 707/506 |
| 2002/0099947 | A1 * | 7/2002 | Evans | 713/193 |
| 2002/0111888 | A1 * | 8/2002 | Stanley et al. | 705/31 |

(Continued)

FOREIGN PATENT DOCUMENTS

WO    WO 01/82202 A2 * 11/2001

OTHER PUBLICATIONS

Oracle Corporation, "Introduction to BLAF Page Templates," Last Updated Apr. 19, 2002, pp. 1-10.*

(Continued)

*Primary Examiner*—Laurie Ries
*Assistant Examiner*—Maikhanh Nguyen
(74) *Attorney, Agent, or Firm*—Townsend and Townsend and Crew LLP

(57) ABSTRACT

One embodiment in accordance with the invention relates to inserting data into a fixed electronic template form. For example, any publicly provided template form (e.g., IRS Tax Form for a Business) that may be provided in Portable Document Format (PDF) can be filled in with the proper data (e.g., XML data) which may be stored and calculated by a database. Specifically, there is the reception of a fixed electronic form. Data is mapped to a field of the fixed electronic form. Based on this mapping, the data is then merged with the field of the fixed electronic form in order to generate a completed electronic form.

25 Claims, 6 Drawing Sheets

U.S. PATENT DOCUMENTS

| | | | |
|---|---|---|---|
| 2002/0120628 A1* | 8/2002 | Hitchcock et al. | 707/100 |
| 2002/0123980 A1* | 9/2002 | Jenkins et al. | 707/1 |
| 2002/0194221 A1* | 12/2002 | Strong et al. | 707/513 |
| 2003/0014442 A1* | 1/2003 | Shiigi et al. | 707/513 |
| 2003/0106021 A1* | 6/2003 | Mangrola | 715/513 |
| 2003/0120578 A1* | 6/2003 | Newman | 705/36 |
| 2003/0212749 A1* | 11/2003 | Jenkins et al. | 709/206 |
| 2003/0216978 A1* | 11/2003 | Sweeney et al. | 705/31 |
| 2003/0233296 A1* | 12/2003 | Wagner | 705/31 |
| 2004/0073868 A1* | 4/2004 | Easter et al. | 715/507 |
| 2004/0078271 A1* | 4/2004 | Morano et al. | 705/19 |
| 2004/0083426 A1* | 4/2004 | Sahu | 715/505 |
| 2004/0199876 A1* | 10/2004 | Ethier et al. | 715/523 |
| 2004/0237030 A1* | 11/2004 | Malkin | 715/505 |
| 2004/0237040 A1* | 11/2004 | Malkin et al. | 715/526 |
| 2004/0254927 A1* | 12/2004 | Lang et al. | 707/5 |
| 2006/0155632 A1* | 7/2006 | Cherkas et al. | 705/36 R |

OTHER PUBLICATIONS

Oracle Corporation, "Notification Page Templates," Last Updated Nov. 21, 2003, pp. 1-11.*

Oracle Corporation, "New Feature in Oracle Reports Developer and Reports Server 6i," An Oracle Technical White Paper, Mar. 2000, pp. 1-13.*

Frank Nimphius, "Integration Oracle9iAS Reports in Oracle9iAS Forms," Oracle Corporation, An Oracle Technical White Paper, Sep. 2001, pp. 1-40.*

Bill Lankenau, "Oracle9i Application Server Portal-Product Features," An Oracle White Paper, May 2001, pp. 1-12.*

M. Hardy et al., "Mapping and Dislaying Structural Transformations between XML and PDF," Proceedings of the 2002 ACM symposium on Document engineering, Nov. 2002, pp. 95-102.*

* cited by examiner

DATA INSERTION FROM A DATABASE INTO A FIXED ELECTRONIC TEMPLATE FORM

BACKGROUND

Large companies, corporations, and businesses can be located within different states of the United States of America and even within diverse countries. As such, these type of business organizations may occasionally have to file divergent kinds of reports with different state and/or country governments. For example, these reports may include tax collection reports or human resource reports. Sometimes, governing bodies may each provide an electronic example of each type of form that is acceptable to filed with it. In this manner, these governing bodies indicate the specific layout of each form they will accept when submitted.

In order for a company to satisfy the governing bodies it is under the jurisdiction of, the company (or an outside vendor) usually exerts a significant amount of time and effort in order to produce electronic forms that replicate the original exemplary forms provided by each of the governing bodies. One reason for exerting all of this time and effort is that if these replica forms are not close enough to the original forms, each of the governing bodies may reject them as unacceptable resulting in exerting additional time and effort to correct the rejected forms.

The present invention may address one or more of the above issues.

SUMMARY

One embodiment in accordance with the invention relates to inserting data into a fixed electronic template form. For example, any publicly provided template form (e.g., IRS Tax Form for a Business) that may be provided in Portable Document Format (PDF) can be filled in with the proper data (e.g., XML data) which may be stored and calculated by a database. Specifically, there is the reception of a fixed electronic form. Data is mapped to a field of the fixed electronic form. Based on this mapping, the data is then merged with the field of the fixed electronic form in order to generate a completed electronic form.

In another embodiment, the present invention provides a method for inserting data into a field of a fixed electronic form. The method includes receiving the fixed electronic form. Furthermore, the method includes mapping data to the field of the fixed electronic form. Moreover, the method includes merging the data with the field of the fixed electronic form based on the mapping to generate an electronic completed form.

In yet another embodiment, the present invention provides a computer system. The computer system includes a processor and a bus coupled with the processor. Additionally, the computer system includes a memory device coupled with the bus to communicate with the processor for performing a method. For example, the method can include receiving a fixed electronic template form. The method also includes binding data of a database to a field of the fixed electronic template form. Additionally, the method includes merging the data with the field of the fixed electronic template form based on the binding to generate a completed electronic form.

In still another embodiment, the present invention provides a computing device readable medium having readable code embodied therein for causing a computing device to perform a method. For example, the method can include receiving a fixed electronic form. The method can also include linking data to a field of the fixed electronic form. Additionally, the method can include utilizing the linking data to merge the data with the field of the fixed electronic form to generate a completed electronic form.

While particular embodiments of the present invention have been specifically described within this summary, it is noted that the invention is not limited to these embodiments. The invention is intended to cover alternatives, modifications and equivalents which may be included within the scope of the invention as defined by the Claims.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of embodiments in accordance with the invention, numerous specific details are set forth in order to provide a thorough understanding of the invention. However, it will be evident to one of ordinary skill in the art that the present invention may be practiced without these specific details. In other instances, well known methods, procedures, components, and circuits have not been described in detail as not to unnecessarily obscure aspects of the invention.

Some portions of the detailed descriptions which follow are presented in terms of procedures, logic blocks, processing, and other symbolic representations of operations on data bits within a computing system or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of operations or instructions leading to a desired result. The operations may involve physical manipulations of physical quantities. Usually, though not necessarily, these physical manipulations take the form of electrical or magnetic signals capable of being stored, transferred, combined, compared, and otherwise manipulated in a computing system or electronic computing device. For reasons of convenience, and with reference to common usage, these signals may be referred to as bits, values, elements, symbols, characters, terms, numbers, or the like with reference to the present invention.

Bear in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "mapping", "merging", "binding", "linking", "determining", "transmitting", "receiving", "generating", "utilizing", "storing" or the like, can refer to the action and processes of a computing system or electronic computing device.

Figure 1:
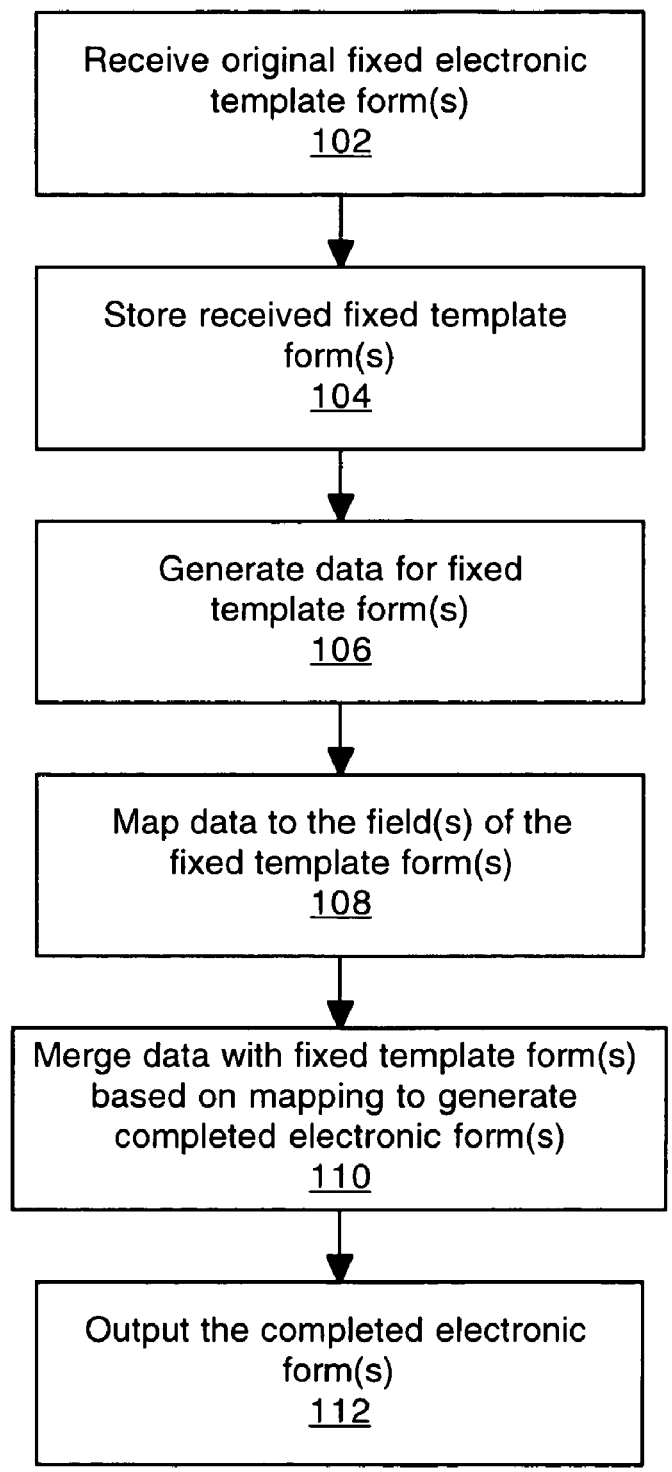
FIG. 1 is a flowchart of a method in accordance with an embodiment of the present invention for enabling the insertion of data into a fixed electronic template form.

FIG. 1 is a flowchart of a method 100 in accordance with an embodiment of the present invention for enabling the insertion of data into a provided (or supplied) fixed electronic template form. Method 100 includes processes of embodiments of the present invention which can be carried out by a processor(s) and electrical components under the control of computing device readable and executable instructions. The computing device readable and executable instructions may reside, for example, in data storage features such as volatile memory, non-volatile memory and/or mass data storage that is usable by a computing device. However, the computing device readable and executable instructions may reside in any type of computing device readable medium. Although specific operations are disclosed in method 100, such operations are exemplary. That is, the present embodiment is well suited to performing various other operations such as, but not limited to, any of those described herein or variations of the operations recited in FIG. 1. It is noted that the operations of method 100 can be performed by software, by firmware, by hardware or by any combination thereof.

The present embodiment provides method 100 for enabling the insertion of data into a provided fixed electronic template form. Specifically, one or more electronic original fixed template forms are received (or retrieved) and then stored for subsequent use. Data can then be generated (or gathered) that are associated with the received fixed electronic template form. It is noted that the data can be generated (or gathered) even before the fixed electronic template form is received or stored. The data are mapped to field(s) that correspond with the fixed template form. Based on this mapping, the data are merged with their corresponding fields of the fixed template form in order to generate an electronic form which has been completed (or filled out). As such, the completed electronic form may then be printed out, stored, and/or transmitted to one or more computing devices and/or locations (e.g., for submission).

At operation 102 of FIG. 1, an original fixed electronic template form is received (or retrieved). It is understood that operation 102 may be modified such that a multitude of original fixed electronic template forms can be received (or retrieved). Furthermore, the receiving (or retrieving) of original fixed electronic template forms at operation 102 can include scanning any placeholder comments of the electronic template forms in order to acquire information about any additional related electronic template forms. If there are any additional related electronic forms, they are also received (or retrieved) at operation 102. The fixed electronic template form(s) can be implemented in a wide variety of ways. For example, the original fixed electronic template form(s) may be implemented with, but not limited to, the Portable Document Format (PDF) developed by Adobe, and the like. The original fixed electronic template form(s) may be provided by, but not limited to, a state government, a county government, a city government, a country government, one or more agencies of a government, a company, a business, a corporation, and/or an organization. Operation 102 can be implemented in a wide variety of ways. For example, the original fixed electronic template form(s) may be received (or retrieved) by a computing device (e.g., 600 of FIG. 6) from, but not limited to, a database via a communications network (e.g., 502 of FIG. 5). Alternatively, the original fixed electronic template form(s) may be received (or retrieved) by a computing device from any type of computing device readable medium, e.g., compact disc (CD), digital versatile disc (DVD), a portable memory device, and the like.

At operation 104, the received fixed electronic template form(s) is stored for subsequent use. It is appreciated that operation 104 can be implemented in diverse ways in accordance with the present embodiment. For example, the received electronic template form(s) can be stored by, but is not limited to, one or more database systems, one or more computer system, one or more memory devices, and/or in any type of format.

At operation 106 of FIG. 1, data can be generated (or gathered) that are associated with the stored fixed electronic template form(s). Operation 106 can be implemented in a wide variety of ways. For example, the data at operation 106 may be implemented in any data format such as, but not limited to, extensible Markup Language (XML) data and the like. Additionally, the gathering of data at operation 106 can include converting various input data sources into a unified standard data format (e.g., XML). In this fashion, data can be received (or retrieved) from existing databases or systems that calculate or manipulate the data that can be merged with one or more fixed electronic forms. Within process 100, it is noted that the generation (or gathering) of the data at operation 106 may take place before operations 102 and/or 104. Additionally, the generation (or gathering) of the data at operation 106 may take place simultaneously (or concurrently) with operations 102 and/or 104.

Figure 2:
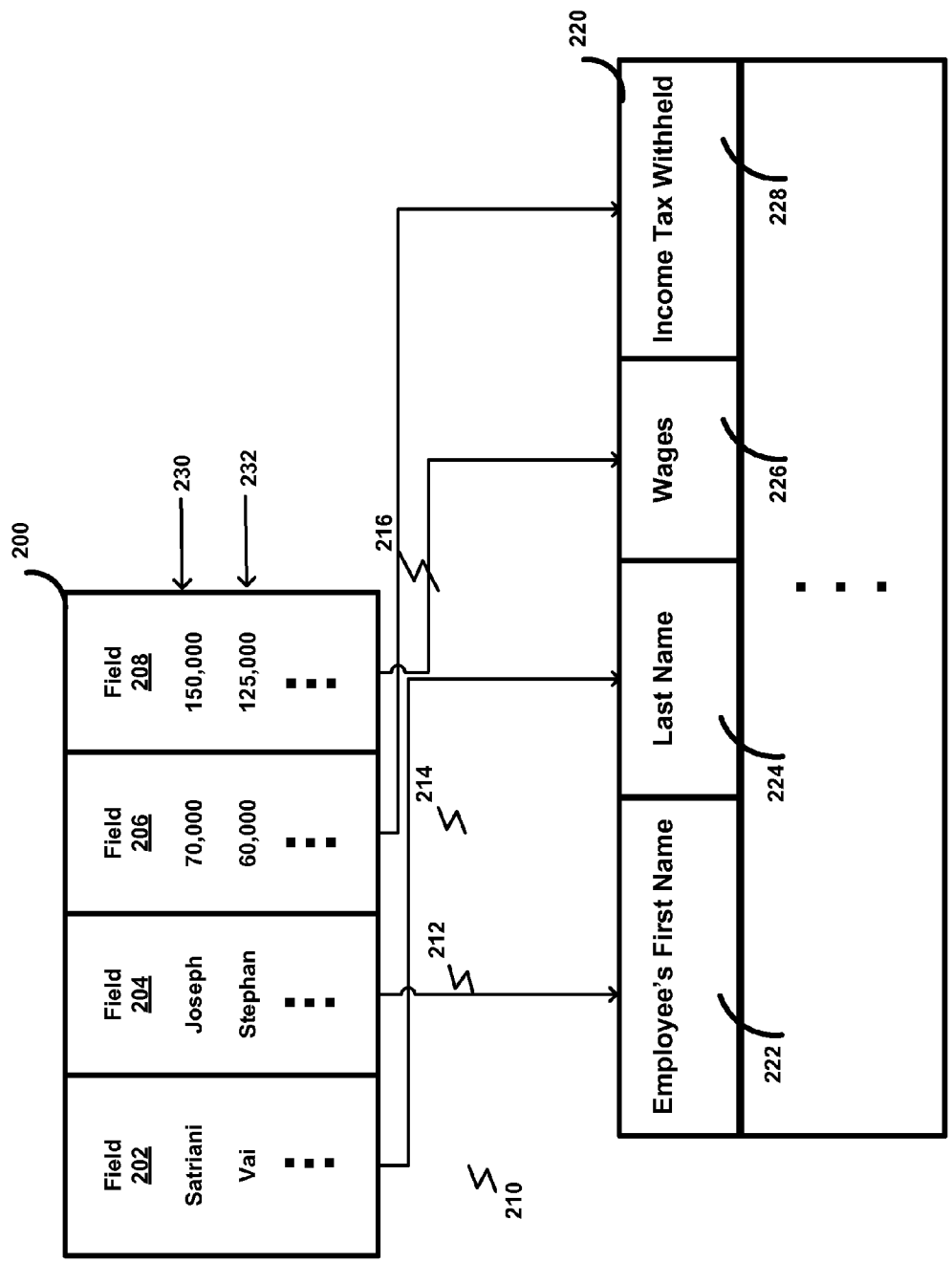
FIG. 2 is an embodiment of mapping (or data binding) data fields of a database to their corresponding fields of a fixed electronic template form in accordance with the present invention.

At operation 108, the data are mapped (or linked or bound) to field(s) they correspond with within the fixed template form(s). It is appreciated that operation 108 can be implemented in diverse ways in accordance with the present embodiment. For example, FIG. 2 is an embodiment of mapping (or data binding) data fields of a database 200 to their corresponding fields of a fixed electronic template form 220 in accordance with the present invention. By mapping in this manner, data of database 200 can be automatically copied and inserted into its corresponding field of template form 220 in order to fill out (or complete) form 220.

Specifically, data field 202 of database 200 is mapped (or linked or bound) to a "Last Name" field 224 of the fixed template form 220 as shown by arrow 210. Additionally, data field 204 of database 200 is mapped (or linked or bound) to an "Employee's First Name" field 222 of the fixed template form 220 as shown by arrow 212. Furthermore, data field 206 of database 200 is mapped (or linked or bound) to a "Income Tax Withheld" field 228 of the fixed template form 220 as shown by arrow 214. Lastly, data field 208 of database 200 is mapped (or linked or bound) to a "Wages" field 226 of the fixed template form 220 as shown by arrow 216. It is noted that data fields 202, 204, 206 and 208 each includes related data. Additionally, the data along row 230 of database 200 are a group of associated data while the data along row 232 are another group of associated data. As such, when mapped and organized in this manner, a row (e.g., 230 or 232) of associated data may be automatically inserted into their corresponding fields of the fixed template form 220. In this manner, the fixed template form 220 may be filled with associated data while preserving the original format of form 220.

It is noted that database 200 can include a greater or fewer number of data fields than shown in FIG. 2. Furthermore, the fixed electronic template form 220 can include a greater or fewer number of insertion fields than shown in FIG. 2.

At operation 110 of FIG. 1, the data are merged with their corresponding fields of the fixed electronic template form(s) based on the mapping (or binding or linking) in order to generate an electronic form(s) or document(s) which has been completed (or filled out). It is understood that operation 110 can be implemented in a wide variety of ways in accordance with the present embodiment. For example, the data can be merged at operation 110 with their corresponding fields of the fixed template form(s) along with any additional related electronic template forms. Furthermore, the "filled out" additional related electronic forms can be merged at operation 110 with one or more "filled out" main electronic forms thereby producing one document that can have sequential page numbering.

Alternatively or in addition to, operation 110 can include a determination of the language of the data and then a font can be generated on the fly for one or more character glyphs (or shapes) which are merged with their corresponding fields of the fixed template form(s). In this manner, the completed electronic form(s) can be displayed and/or printed out without the need for additional fonts and/or special language handling abilities. Operation 110 can include parsing of the electronic fixed template form(s), fetching any information about placeholders, and converting the electronic fixed template form(s) into static text that is merged with the data to generate a completed (or filled out) electronic form(s). In this fashion, further modification of the completed electronic form(s) by a user is prevented. It is appreciated that the merging at operation 110 may be implemented in any manner similar to that described herein, but is not limited to such.

At operation 112, the completed electronic form(s) can then be output. It is noted that operation 112 can be implemented in diverse ways. For example, at operation 112 the completed electronic form(s) may be printed out and/or transmitted to one or more computer systems (e.g., 600) and/or locations, e.g., via a communication network (e.g., 502 of FIG. 5). For example, the completed electronic form(s) may be electronically filed via e-mail (electronic mail) or uploading to a governing body. This is beneficial to the receiving organization since it enables them to extract the data from the submitted completed electronic form(s). Additionally, the completed electronic form(s) or document(s) can be encrypted at operation 112 before being output in order to prevent any unauthorized modification of the completed electronic form(s). It is understood that operation 112 is an optional operation of process 100. Furthermore, the completed electronic form(s) can be stored (e.g., for subsequent use or transmission). At the completion of operation 112, process 100 is exited.

It is noted that method 100 is able to receive different fixed electronic template forms without utilizing any additional resources. Furthermore, since process 100 can receive updated fixed electronic template forms, it involves minimum maintenance to those forms. Additionally, if process 100 receives many different fixed electronic template forms each having a different layout, a super set of data (e.g., XML data) can be utilized to fill out each of these different forms. As such, many different forms can be filled out with the same data. Alternatively, a super set of data can include different subcategories of data wherein each may be utilized to fill out a different fixed electronic template form.

Figure 3:
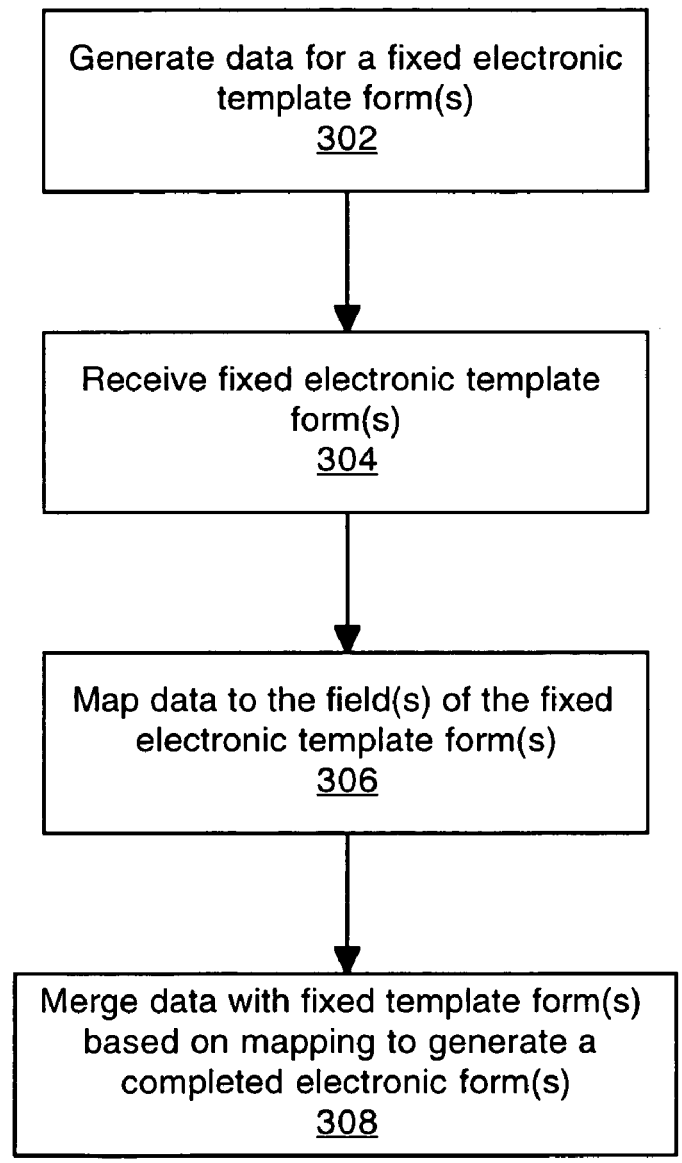
FIG. 3 is a flowchart of a method in accordance with an embodiment of the present invention for directly inserting data into a fixed electronic template form.

FIG. 3 is a flowchart of a method 300 in accordance with an embodiment of the present invention for directly inserting data into a received fixed electronic template form. Method 300 includes processes of embodiments of the present invention which can be carried out by a processor(s) and electrical components under the control of computing device readable and executable instructions. The computing device readable and executable instructions may reside, for example, in data storage features such as volatile memory, non-volatile memory and/or mass data storage that is usable by a computing device. However, the computing device readable and executable instructions may reside in any type of computing device readable medium. Although specific operations are disclosed in method 300, such operations are exemplary. That is, the present embodiment is well suited to performing various other operations such as, but not limited to, any of those described herein or variations of the operations recited in FIG. 3. It is noted that the operations of method 300 can be performed by software, by firmware, by hardware or by any combination thereof.

The present embodiment provides method 300 for directly inserting data on the fly into a received fixed electronic template form. Specifically, data can then be generated (or gathered) that may be associated with a fixed electronic template form. Next, one or more fixed electronic template forms are received (or retrieved). On the fly, the data are mapped to the field(s) that they correspond with of the fixed electronic template form. Based on the mapping, the data are merged on the fly with their corresponding fields of the fixed electronic template form in order to generate an electronic form which has been completed (or filled out). In this manner, there is no need to store the fixed electronic template forms before they are merged with the data.

At operation 302 of FIG. 3, data can be generated (or gathered) that may be associated with one or more fixed electronic template forms. It is noted that operation 302 can be implemented in a wide variety of ways in accordance with the present embodiment. The data at operation 302 may be implemented in any data format. For example, the data may be implemented as, but is not limited to, XML data and the like. Furthermore, the gathering of data at operation 302 can include converting various input data sources into a unified standard data format (e.g., XML). In this manner, data can be received (or retrieved) from existing databases or systems that calculate or manipulate the data that can be merged with one or more fixed electronic forms.

At operation 304, a fixed electronic template form is received (or retrieved). It is understood that operation 304 may be modified such that a multitude of fixed electronic template forms are received (or retrieved). Furthermore, the receiving (or retrieving) of fixed electronic template forms at operation 304 may include scanning any placeholder comments of the electronic template forms in order to acquire information about any additional related electronic template forms. If it is determined that there are any additional related electronic forms, they are also received (or retrieved) at operation 304. The fixed electronic template form(s) of operation 304 can be implemented in a wide variety of ways. For example, the electronic original fixed template form(s) may be implemented with, but not limited to, Adobe® PDF and the like. The fixed electronic template form(s) may be provided by, but is not limited to, a state government, a county government, a city government, a country government, one or more agencies of a government, a company, a business, a corporation, and/or an organization. Operation 304 can be implemented in diverse ways. For example, the fixed electronic template form(s) may be received (or retrieved) by a computing device (e.g., 600) from a server via a communications network (e.g., 502). Alternatively, the electronic original fixed template form(s) may be received (or retrieved) by a computing device from any type of computing device readable medium (e.g., CD, DVD, a portable memory device, and the like).

Within process 300, it is noted that the generation (or gathering) of the data at operation 302 may take place after operation 304. Alternatively, the generation (or gathering) of the data at operation 302 may take place concurrently (or simultaneously) with operation 304.

At operation 306 of FIG. 3, the data are mapped (or bound or linked) on the fly to the field(s) they correspond with of the fixed electronic template form(s). It is appreciated that operation 306 can be implemented in diverse ways in accordance with the present embodiment. For example, the mapping (or binding or linking) at operation 306 may be implemented in a manner similar to that described herein with reference to FIG. 2, but is not limited to such.

At operation 308, the data are directly merged on the fly with their corresponding field(s) of the fixed template form(s) based on the mapping (or linking or binding) in order to generate one or more electronic forms or documents which have been filled out (or completed). It is appreciated that operation 308 can be implemented in a wide variety of ways. For example, the data can be merged on the fly at operation 308 with their corresponding fields of the fixed template form(s) along with any additional related electronic template forms. Moreover, the "filled out" additional related electronic forms can be merged at operation 308 with one or more "filled out" main electronic forms thereby producing one document that can have sequential page numbering.

Alternatively or in addition to, the merge on the fly at operation 308 can include a determination of the language of the data and then a font can be generated on the fly for one or more character glyphs (or shapes) of the data which are merged with their corresponding fields of the fixed template form(s). In this fashion, the completed electronic form(s) can be displayed and/or printed out without the need for additional fonts and/or special language handling abilities. Operation 308 can include on the fly parsing of the electronic fixed template form(s), fetching any information about placeholders, and converting the electronic fixed template form(s) into static text that can be merged with the data to generate one or more completed (or filled out) electronic forms or documents. In this manner, further modification of the completed electronic form(s) by a user is prevented.

It is noted that the merging at operation 308 may be implemented in any manner similar to that described herein, but is not limited to such. At the completion of operation 308, process 300 is exited. It is noted that upon exiting process 300, the completed electronic form(s) may then be encrypted, printed out, stored, and/or electronically transmitted to one or more computing devices (e.g., 600) and/or locations (e.g., for submission). Within process 300, data is directly inserted on the fly into fixed electronic template forms without storing the fixed electronic template forms beforehand. Instead, a Uniform Resource Locator (URL) associated with a fixed electronic template form(s) can be stored and later utilized to receive (or retrieve) the fixed template form(s) at operation 304.

Figure 4:
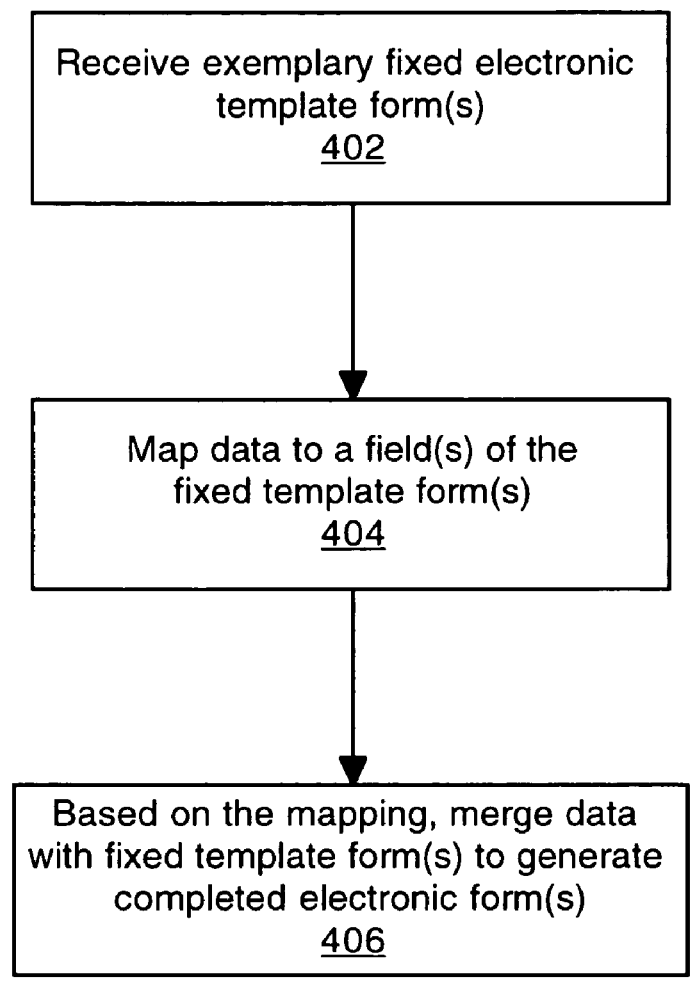
FIG. 4 is a flowchart of a method in accordance with an embodiment of the present invention for inserting data into a fixed electronic template form.

FIG. 4 is a flowchart or a method 400 in accordance with an embodiment of the present invention for inserting data into a fixed electronic template form. Method 400 includes processes of embodiments of the present invention which can be carried out by a processor(s) and electrical components under the control of computing device readable and executable instructions. The computing device readable and executable instructions may reside, for example, in data storage features such as volatile memory, non-volatile memory and/or mass data storage that is usable by a computing device. However, the computing device readable and executable instructions may reside in any type of computing device readable medium. Although specific operations are disclosed in method 400, such operations are exemplary. That is, the present embodiment is well suited to performing various other operations such as, but not limited to, any of those described herein or variations of the operations recited in FIG. 4. It is noted that the operations of method 400 can be performed by software, by firmware, by hardware or by any combination thereof.

The present embodiment provides method 400 for inserting data into a field of a fixed electronic template form. Specifically, a fixed electronic template form is received (or retrieved) for subsequent use. Data are mapped to the field that it corresponds with of the fixed electronic template form. Based on the mapping, the data are merged with its corresponding field of the fixed electronic template form in order to generate an electronic form which has been filled out (or completed). Upon completion of process 400, the completed electronic form may then be printed out, stored, and/or transmitted to one or more locations.

At operation 402 of FIG. 4, one or more fixed electronic template forms are received (or retrieved). Furthermore, the receiving (or retrieving) of fixed electronic template forms at operation 402 may include scanning any placeholder comments of the electronic template forms in order to acquire information about any additional related electronic template forms. If it is determined that there are any additional related electronic forms, they are also received (or retrieved) at operation 402. The fixed electronic template form(s) of operation 402 can be implemented in diverse ways. For example, the original fixed electronic template form(s) may be implemented with, but not limited to, Adobe® PDF and the like. It is noted that the fixed electronic template form(s) may be provided by, but not limited to, a state government, a county government, a city government, a country government, one or more agencies of a government, a company, a business, a corporation, and/or an organization. Operation 402 can be implemented in a wide variety of ways. For example, the fixed electronic template form(s) may be received (or retrieved) by a computing device (e.g., 600) via a communications network (e.g., 502). Alternatively, the fixed electronic template form(s) may be received (or retrieved) by a computing device from any type of computing device readable medium (e.g., CD, DVD, a portable memory device, and the like).

At operation 404, data are mapped (or linked or bound) to one or more fields corresponding with the fixed electronic template form(s). It is noted that the data may be stored by one or more memory devices or a database. Additionally, the data at operation 404 may be implemented in any data format. For example, the data may be implemented as, but is not limited to, XML data and the like. Moreover, the data at operation 404 may have been converted from various input data sources into a unified standard data format (e.g., XML). In this fashion, data can be received (or retrieved) from existing databases or systems that calculate or manipulate the data that can be merged with one or more fixed electronic forms. Operation 404 can be implemented in a wide variety of ways. For example, the mapping at operation 404 may be implemented in a manner similar to that described herein with reference to FIG. 2, but is not limited to such.

At operation 406 of FIG. 4, the data are merged with its corresponding field(s) of the fixed electronic template form(s) based on the mapping (or linking or binding) in order to generate one or more electronic forms or documents which have been filled out (or completed). It is understood that operation 406 can be implemented in diverse ways. For example, the data can be merged at operation 406 with its corresponding field(s) of the fixed template form(s) along with any additional related electronic template forms. Furthermore, the "filled out" additional related electronic form(s) can be merged at operation 308 with one or more "filled out" main electronic forms thereby producing one document that can have sequential page numbering.

Alternatively or in addition to, operation 406 can include a determination of the language of the data and then a font can be generated on the fly for one or more character glyphs (or shapes) of the data which are merged with their corresponding field(s) of the fixed template form(s). In this manner, the completed electronic form(s) can be displayed and/or printed out without the need for additional fonts and/or special language handling abilities. Operation 406 can include parsing of the electronic fixed template form(s), fetching any information about placeholders, and converting the electronic fixed template form(s) into static text that is merged with the data to generate a completed (or filled out) electronic form(s). In this fashion, further modification or alteration of the completed electronic form(s) by a user is prevented.

It is appreciated that the merging at operation 406 may be implemented in any manner similar to that described herein, but is not limited to such. At the completion of operation 406, process 400 is exited. It is noted that upon exiting process 400, the completed electronic form(s) may then be encrypted, printed out, stored, and/or electronically transmitted to one or more computer systems (e.g., 600) and/or locations (e.g., for submission).

Figure 5:
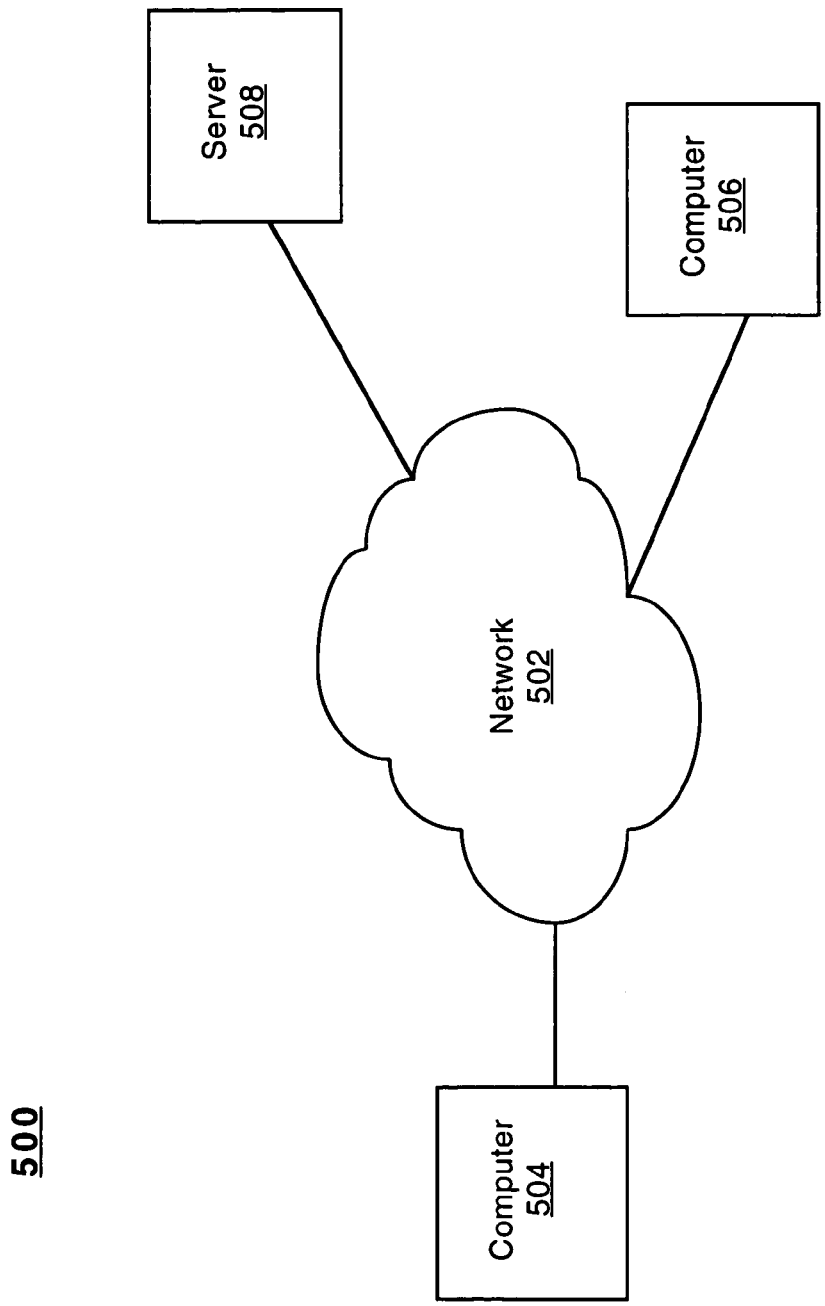
FIG. 5 is a block diagram of an exemplary network that may be utilized in accordance with embodiments of the present invention.

FIG. 5 is a block diagram of an exemplary network 500 that may be utilized in accordance with embodiments of the present invention. For example, computer systems (or computing devices) 504 and 506 may each be utilized to receive one or more fixed electronic template forms from a server 508 via a network 502. It is understood that the fixed electronic template form may enable computers 504 and/or 506 to perform in accordance with one or more embodiments (e.g., flowcharts 100, 300 and/or 400) of the present invention.

Within networking environment 500, server 508 and computers 504 and 506 may be coupled in order to communicate. Specifically, server 508 and computers 504 and 506 are communicatively coupled with network 502. It is appreciated that server 508 and computers 504 and 506 may each be communicatively coupled with network 502 via wired and/or wireless communication technologies.

The network 502 of networking environment 500 may be implemented in a wide variety of ways in accordance with the present embodiment. For example, network 502 may be implemented as, but is not limited to, a local area network (LAN), a metropolitan area network (MAN), a wide area network (WAN), and/or the Internet. It is noted that networking environment 500 is well suited to be implemented without network 502. As such, server 508 and computers 504 and 506 may be communicatively coupled via wired and/or wireless communication technologies.

Within FIG. 5, it is understood that networking environment 500 may be implemented to include a greater or fewer number of computing devices than the two computers (e.g., 504 and 506) shown. Additionally, networking environment 500 may be implemented to include a greater number of server devices than the one server device (e.g., 508) shown. It is noted that server 508 and computers 504 and 506 may each be implemented in a manner similar to a computer system 600 of FIG. 6 described herein. However, these devices of networking environment 500 are not in any way limited to such an implementation.

Figure 6:
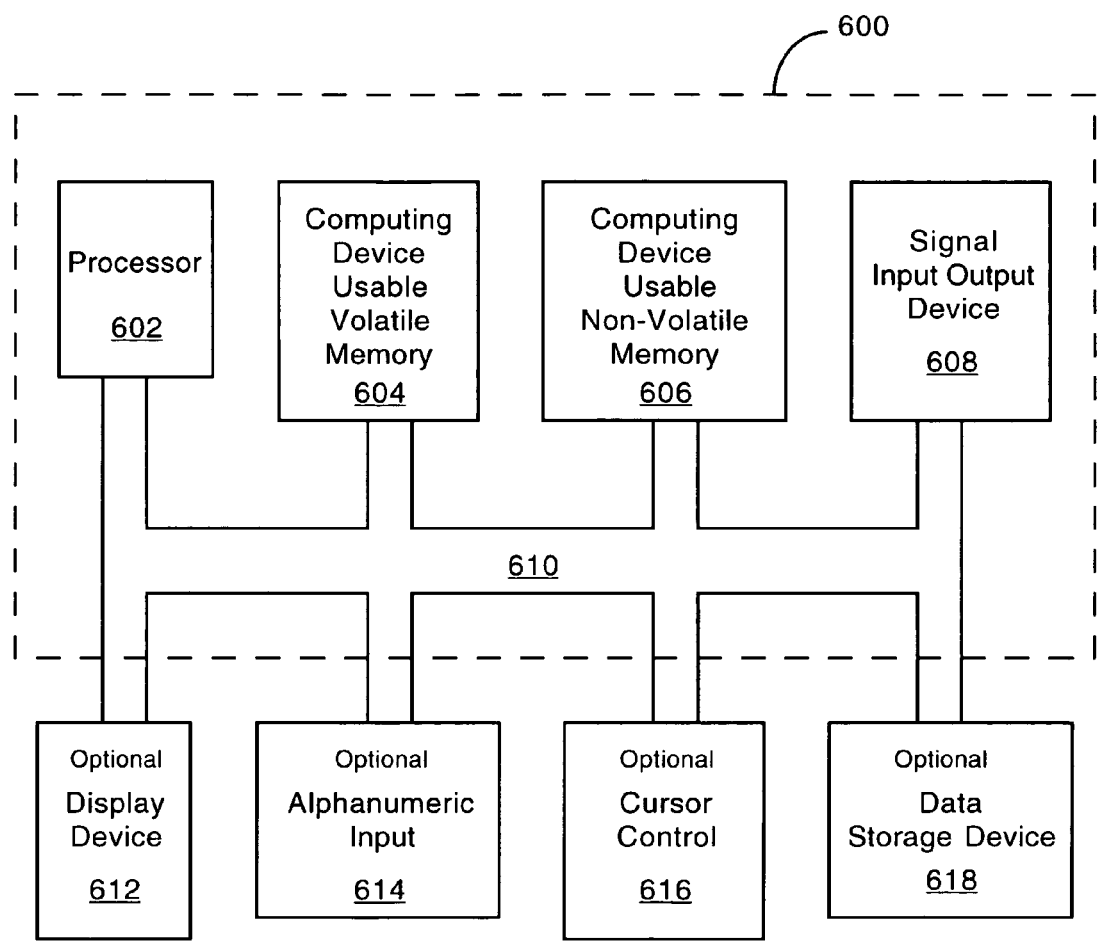
FIG. 6 is a block diagram of an exemplary computer system that may be used in accordance with embodiments of the present invention.

FIG. 6 is a block diagram of an exemplary computer system 600 that may be used in accordance with embodiments of the present invention. It is understood that system 600 is not strictly limited to be a computer system. As such, system 600 of the present embodiment is well suited to be any type of computing device (e.g., server computer, desktop computer, laptop computer, portable computing device, database computer, etc.). Within the discussions herein of embodiments in accordance with the present invention, certain processes and operations were discussed that may be realized, in some embodiments, as a series of instructions (e.g., software program) that reside within computing device readable memory of system 600 and executed by a processor(s) of system 600. When executed, the instructions can cause computer 600 to perform specific operations and exhibit specific behavior which are described herein.

Computer system 600 comprises an address/data bus 610 for communicating information, one or more central processors 602 coupled with bus 610 for processing information and instructions. Central processor unit(s) 602 may be a microprocessor or any other type of processor. The computer 600 also includes data storage features such as computing device usable volatile memory 604, e.g., random access memory (RAM), static RAM, dynamic RAM, etc., coupled with bus 610 for storing information and instructions for central processor(s) 602, computing device usable non-volatile memory 606, e.g., read only memory (ROM), programmable ROM, flash memory, erasable programmable read only memory (EPROM), electrically erasable programmable read only memory (EEPROM), etc., coupled with bus 610 for storing static information and instructions for processor(s) 602.

System 600 of FIG. 6 also includes one or more signal generating and receiving devices 608 coupled with bus 610 for enabling system 600 to interface with other electronic devices. The communication interface(s) 608 of the present embodiment may include wired and/or wireless communication technology. For example, in one embodiment of the present invention, the communication interface 608 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment, a cable or digital subscriber line (DSL) connection may be employed. In such a case the communication interface(s) 608 may include a cable modem or a DSL modem.

Optionally, computer system 600 can include an alphanumeric input device 614 including alphanumeric and function keys coupled with the bus 610 for communicating information and command selections to the processor(s) 602. The computer 600 can also include an optional cursor control or cursor directing device 616 coupled with the bus 610 for communicating user input information and command selections to the processor(s) 602. The cursor directing device 616 can be implemented using a number of well known devices such as a mouse, a track ball, a track pad, an optical tracking device, a touch screen, etc. Alternatively, it is appreciated that a cursor can be directed and/or activated via input from the alphanumeric input device 614 using special keys and key sequence commands. The present embodiment is also well suited to directing a cursor by other means such as, for example, voice commands.

The system 600 of FIG. 6 can also include a computing device usable mass data storage device 618 such as a magnetic or optical disk and disk drive (e.g., hard drive or floppy diskette) coupled with bus 610 for storing information and instructions. An optional display device 612 is coupled with bus 610 of system 600 for displaying video and/or graphics. It should be appreciated that optional display device 612 may be a cathode ray tube (CRT), flat panel liquid crystal display (LCD), field emission display (FED), plasma display or any other display device suitable for displaying video and/or graphic images and alphanumeric characters recognizable to a user.

It is noted that the components associated with system 600 described above may be resident to and associated with one physical computing device. However, one or more of the components associated with system 600 may be physically distributed to other locations and be communicatively coupled together (e.g., via a network).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for inserting data into a plurality of fixed electronic forms, said method comprising:
   receiving a first fixed electronic form of a plurality of fixed electronic forms, wherein each of the plurality of fixed electronic forms is provided by a different entity and wherein each of the fixed electronic forms has a different original format;
   parsing said first fixed electronic form;
   scanning said parsed first fixed electronic form for placeholder comments in the first fixed electronic form;
   identifying based on the placeholder comments one or more electronic forms related to said first fixed electronic form and having an original layout format;
   receiving said one or more electronic forms related to the first fixed electronic form;
   mapping input data to a field of said first fixed electronic form and to a field of said one or more electronic forms related to the first fixed electronic form;
   merging said input data with said field of said first fixed electronic form and said field of said one or more electronic forms related to the first fixed electronic form based on said mapping;
   generating a first completed electronic form based on merging said input data with said field of said first fixed electronic form, wherein said first completed electronic form comprises a version of the first fixed electronic form which is filled out with said input data, wherein said merging prevents modification to said first completed electronic form, and wherein said merging preserves the original layout format of said first fixed electronic form in said first completed electronic form; and
   generating one or more second completed electronic forms based on merging said input data with said field of said one or more electronic forms related to the first fixed electronic form, wherein said one or more second completed electronic forms comprise a version of the one or more electronic forms related to the first fixed electronic form which is filled out with said input data, wherein said merging prevents modification to said one or more second completed forms, and wherein said merging preserves the original layout format of said one or more electronic forms related to the first fixed electronic form in said one or more second completed electronic forms.

2. The method as described in claim 1, further comprising:
   storing said first fixed electronic form subsequent to said merging.

3. The method as described in claim 1, further comprising: generating said data.

4. The method as described in claim 1, wherein said data comprises eXtensible Markup Language (XML) data.

5. The method as described in claim 1, further comprising: transmitting said first completed electronic form.

6. The method as described in claim 1, wherein said receiving said first fixed electronic form comprises utilizing a communication network.

7. The method as described in claim 1, further comprising: determining the language of said data; and
   generating a font for a character glyph of said data.

8. The method of claim 1, further comprising:
   receiving a second fixed electronic form having an original layout format, wherein the first electronic form is received from a first governing body, the second fixed electronic form is received from a second governing body different from the first governing body, and the original layout format of the second fixed electronic form is different from the original layout format of the first fixed electronic form;
   parsing said second fixed electronic form;
   scanning said parsed second fixed electronic form for placeholder comments in the second fixed electronic form;
   identifying based on the placeholder comments one or more electronic forms related to said second fixed electronic form and having an original layout format, wherein the one or more electronic forms related to the first fixed electronic form are provided by the first governing body, the one or more electronic forms related to the second fixed electronic form are provided by the second governing body, and wherein the original layout format of the one or more electronic forms related to the first fixed electronic form is different from the original layout format of the one or more electronic forms related to the second fixed electronic form;
   receiving said one or more electronic forms related to the second fixed electronic form from the second governing body;
   mapping the input data to a field of said second fixed electronic form and to a field of said one or more electronic forms related to the second fixed electronic form;
   merging said input data with said field of said second fixed electronic form and said field of said one or more electronic forms related to the second fixed electronic form based on said mapping;
   generating a third completed electronic form based on merging said input data with said field of said second fixed electronic form, wherein said third completed electronic form comprises a version of the second fixed electronic form which is filled out with said input data, wherein said merging prevents modification to said third completed electronic form, and wherein said merging preserves the original layout format of said second fixed electronic form in said third completed electronic form; and generating one or more fourth completed electronic forms based on merging said input data with said field of said one or more electronic forms related to the second fixed electronic form, wherein said one or more fourth completed electronic forms comprise a version of the one or more electronic forms related to the second fixed electronic form which is filled out with said input data, wherein said merging prevents modification to said one or more fourth completed forms, and wherein said merging preserves the original layout format of said one or more electronic forms related to the second fixed electronic form in said one or more fourth completed electronic forms.

9. The method as described in claim 8, wherein said first fixed electronic form, said first fixed electronic form, said second fixed electronic form, said one or more electronic forms related to the first fixed electronic form, said one or more electronic forms related to the second fixed electronic form, said first completed electronic form, said one or more second completed electronic forms, said third completed electronic form, and said fourth one or more completed electronic forms each comprise a Portable Document Format (PDF) form.

10. The computer system of claim 8, wherein said fixed electronic form, said first completed electronic form, and said one or more second completed electronic forms each comprise a Portable Document Format (PDF) form.

11. A computer system comprising:
a processor;
a bus coupled with said processor; and
a memory device coupled with said bus to communicate with said processor for performing a method comprising:
receiving a fixed electronic form of a plurality of fixed electronic forms, wherein each of the plurality of fixed electronic forms is provided by a different entity and wherein each of the plurality of fixed electronic forms has a different original format;
parsing said fix electronic form;
scanning said parsed fixed electronic form for placeholder comments in the fixed electronic form;
identifying based on the placeholder comments one or more electronic forms related to said fixed electronic form;
receiving said one or more related electronic forms;
binding data of a database to a field of said fixed electronic template form and to a field of said one or more related electronic forms;
merging said data with said field of said fixed electronic template form and said field of said one or more related electronic forms based on said binding;
generating a first completed electronic form based on merging said input data with said field of said fixed electronic form, wherein said first completed electronic form comprises a version of the electronic form which is filled out with said input data, wherein said merging prevents modification to said first completed electronic form, and wherein said merging preserves the original layout format of said fixed electronic form in said first completed electronic form; and generating one or more second completed electronic forms based on merging said input data with said field of said one or more related electronic forms, wherein said one or more second completed electronic forms comprise a version of the one or more related electronic forms which is filled out with said input data, wherein said merging prevents modification to said one or more second completed forms, and wherein said merging preserves the original layout format of said one or more related electronic forms in said one or more second completed electronic forms.

12. The computer system of claim 11, wherein said method further comprising:
storing said fixed electronic template form subsequent to said merging.

13. The computer system of claim 11, wherein said method further comprising:
gathering said data.

14. The computer system of claim 11, wherein said data comprises eXtensible Markup Language (XML) data.

15. The computer system of claim 11, wherein said method further comprising:
sending said completed electronic form to a second computer system.

16. The computer system of claim 11, wherein said receiving said fixed electronic template form comprises utilizing a communication network.

17. The computer system of claim 11, wherein said method further comprising:
converting said fixed electronic template form into static text.

18. The computer readable storage medium of claim 11 wherein said fixed electronic form, said first completed electronic form, and said one or more second completed electronic forms each comprise a Portable Document Format (PDF) form.

19. A computer readable storage medium having readable code embodied therein for causing a computing device to perform a method comprising:
receiving a fixed electronic form of a plurality of fixed electronic forms, wherein each of the plurality of fixed electronic forms is provided by a different entity and wherein each of the fixed electronic forms has a different original format;
parsing said fixed electronic form;
scanning said parsed fixed electronic form for placeholder comments in the fixed electronic form;
identifying based on the placeholder comments one or more electronic forms related to said fixed electronic form;
receiving said one or more related electronic forms;
linking data to a field of said fixed electronic form and to a field of said one or more related electronic forms;
utilizing said linking to merge said data with said field of said fixed electronic form and said field of said one or more related electronic forms;
generating a first completed electronic form based on merging said input data with said field of said fixed electronic form, wherein said first completed electronic form comprises a version of the electronic form which is filled out with said input data, wherein said utilizing said linking to merge said data with said field of said fixed electronic form prevents modification to said first completed electronic from, and wherein said merging preserves the original layout format of said fixed electronic form in said first completed electronic form; and
generating one or more second completed electronic forms based on merging said input data with said field of said one or more related electronic forms, wherein said one or more second completed electronic forms comprise a version of the one or more related electronic forms which is filled out with said input data, wherein said utilizing said linking to merge said data with said field of said fixed electronic form prevents modification to said first completed electronic from, and wherein said merging preserves the original layout format of said fixed electronic form in said one or more second completed electronic forms.

20. The computer readable storage medium of claim 19, wherein said method further comprising:
   storing said fixed electronic form subsequent to said merging.

21. The computer readable storage medium of claim 19, wherein said method further comprising:
   gathering said data.

22. The computer readable storage medium of claim 19, wherein said data comprises eXtensible Markup Language (XML) data.

23. The computer readable storage medium of claim 19, wherein said method further comprising:
   outputting said completed electronic form to a computer system.

24. The computer readable storage medium of claim 19, wherein said receiving said fixed electronic form comprises utilizing a communication network.

25. The computer readable storage medium of claim 19, wherein said method further comprising:
   encrypting said completed electronic form.

* * * * *

UNITED STATES PATENT AND TRADEMARK OFFICE
CERTIFICATE OF CORRECTION

PATENT NO. : 7,747,938 B2  
APPLICATION NO. : 10/839435  
DATED : June 29, 2010  
INVENTOR(S) : Osama Elkady Page 1 of 1

It is certified that error appears in the above-identified patent and that said Letters Patent is hereby corrected as shown below:

On page 2, in column 2, under "Other Publications", line 11, delete "Dislaying" and insert -- Displaying --, therefor.

In column 4, line 26, delete "extensible" and insert -- eXtensible --, therefor.

In column 13, line 44, in claim 11, delete "fix" and insert -- fixed --, therefor.

In column 14, line 30, in claim 18, delete "11" and insert -- 11, --, therefor.

In column 14, line 62, in claim 19, delete "from," and insert -- form, --, therefor.

In column 15, line 6, in claim 19, delete "from," and insert -- form, --, therefor.

Signed and Sealed this
Nineteenth Day of April, 2011

David J. Kappos
*Director of the United States Patent and Trademark Office*